(12) United States Patent
Ronan et al.

(10) Patent No.: US 7,691,929 B2
(45) Date of Patent: Apr. 6, 2010

(54) FLAME RETARDANT COMPOSITIONS

(75) Inventors: Nicolas Ronan, Abo (FI); Carl-Eric Magnus Wilén, Esbo (FI)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 12/319,676

(22) Filed: Jan. 9, 2009

(65) Prior Publication Data

US 2009/0186970 A1    Jul. 23, 2009

Related U.S. Application Data

(63) Continuation of application No. 10/573,850, filed as application No. PCT/EP2004/052271 on Sep. 22, 2004, now abandoned.

(30) Foreign Application Priority Data

Oct. 1, 2003   (EP)   ................. 03396092

(51) Int. Cl.
    C08K 5/22 (2006.01)
    C08K 5/23 (2006.01)
    C08K 5/24 (2006.01)
    C08K 5/27 (2006.01)
(52) U.S. Cl. .............. 524/190; 524/189; 524/191; 524/192; 524/193; 524/194
(58) Field of Classification Search .......... 524/189–194
    See application file for complete search history.

(56) References Cited

U.S. PATENT DOCUMENTS

| | | | |
|---|---|---|---|
| 3,058,926 A | 10/1962 | Eichhorn | |
| 3,269,962 A | 8/1966 | Eichhorn | |
| 3,271,333 A | 9/1966 | Eichhorn | |
| 3,284,544 A | 11/1966 | Eichhorn | |
| 3,296,340 A | 1/1967 | Eichhorn | |
| 3,420,786 A | 1/1969 | Weber et al. | |
| 3,862,107 A | 1/1975 | MacLeay | |
| 3,897,373 A | 7/1975 | Bachl et al. | |
| 3,992,355 A | 11/1976 | Itoh et al. | |
| 4,115,344 A | 9/1978 | Brady | |
| 4,237,179 A | 12/1980 | Mentzel et al. | |
| 4,337,319 A | 6/1982 | Rigler et al. | |
| 4,486,347 A | 12/1984 | Gorbacheva et al. | |
| 4,710,528 A | 12/1987 | Bertelli et al. | |
| 5,269,963 A | 12/1993 | Uchida et al. | |

FOREIGN PATENT DOCUMENTS

| | | |
|---|---|---|
| EP | 1239005 | 9/2002 |
| GB | 1015217 | 12/1965 |
| WO | 03046016 | 6/2003 |

OTHER PUBLICATIONS

Patent Abstracts of Japan Publication No. 2001348481, Publication Date Dec. 18, 2001.
Patent Abstracts of Japan Publication No. 2001131353, Publication Date May 15, 2001.
Chem. Abstract 1966:491545 for FR 1425563, Jan. 21, 1966.

*Primary Examiner*—Peter Szekely
(74) *Attorney, Agent, or Firm*—Tyler A. Stevenson

(57) ABSTRACT

The present invention is directed a method of flame retarding a polymeric substrate using a specific group of azo and peroxide derivatives as flame retardants, to flame retardant compositions as well as to novel azo compounds usable as flame retarding compounds.

17 Claims, No Drawings

FLAME RETARDANT COMPOSITIONS

This is a continuation of U.S. application Ser. No. 10/573,850, filed Mar. 29, 2006 abandoned, which is a 371 of international app. No. PCT/EP2004/052271, filed Sep. 22, 2004, which applications are incorporated by reference.

The present invention is directed to a method of flame retarding a polymeric substrate using a specific group of compounds as flame retardants, to flame retardant compositions as well as to novel compounds usable as flame retarding compounds.

Typically, inorganic and organic flame retardant (FR) compounds have been used for flame retarding various types of polymers. The main types of FR's include halogenated hydrocarbons, phosphorous containing compounds, metallic compounds such as metal oxides and hydroxides, and melamine derivatives. Halogenated FR's are very commonly used due to their effectiveness. Nevertheless, the use of halogenated compounds has generally become of an environmental concern.

To diminish the problems relating to halogenated FR's synergists are often used in combination with halogenated FR's. Synergists are compounds which enhance the flame retarding properties of the halogenated FR's and thus enable to use the halogenated FR's in substantially reduced amounts. Synergistic compounds encompass a group of compounds known as "free radical initiators" which include organic peroxide (see e.g. U.S. Pat. No. 3,058,926), dibenzyl (see e.g. U.S. Pat. No. 3,271,333 and U.S. Pat. No. 3,420,786), disulfide (see e.g. U.S. Pat. No. 3,284,544), hydrazone (see e.g. U.S. Pat. No. 3,269,962), and azo compounds (see e.g. U.S. Pat. No. 4,237,179, U.S. Pat. No. 3,897,373, U.S. Pat. No. 4,486,347 and FR 1425563). See also U.S. Pat. No. 347,204, U.S. Pat. No. 3,296,340, GB 1015217, U.S. Pat. No. 4,337,319, WO 03046016, U.S. Pat. No. 4,710,528, EP 1239005. Accordingly, the synergists are used only in combination with other FR's, and typically with said halogenated FR's, and/or they may be halogenated by themselves. The azo compounds have been used e.g. as an azo dye with an additional function as a FR synergist, and typically complexed with a metal, e.g. Cu or Cr.

Many of these free radical initiators have also been used for other purposes, i.a. for controlling certain properties of a polymer during a polymerisation process or for grafting a polymer, as foaming agent or as dyes as mentioned above etc. (see U.S. Pat. No. 5,079,283, WO 00/19452, U.S. Pat. No. 3,826,764 and also EP 402 904 and EP 0073488).

Non-halogenated N-hydrocarbyloxy hindered amines (NOR-hindered amines) have also been proposed for solving the problem. These can be used alone, e.g. in place of halogenated FR's, or as a synergist for FR applications (see e.g. WO 99/00450).

There still exists a high demand for effective non-halogenated flame retarding compounds, which would provide an industrially and environmentally desirable alternative for the halogenated FR compounds.

The inventors have unexpectedly found that a specific group of non-halogenated azo and hydrazine derivatives show themselves flame retarding efficacy when used e.g. in polymeric applications, i.e. they need not to be combined e.g. with other FR's, such as conventional organic or inorganic halogenated FR compounds or with phosphorous, antimony or metal hydroxide FR compounds. Advantageously, they can be used in place of the halogenated, e.g. the conventional brominated or chlorinated FR's.

The present finding is surprising, since in the prior art "free radical initiators", i.e. dibenzyl, peroxide, azo etc. compounds known in the field are disclosed to be useful only in combination with other, particularly with halogenated, FR's. According to the prior art they act by enhancing the properties of the halogenated FR's. Thus, the now found FR efficacy of the present compounds is a new property which is contrary to the prior art teaching or belief. More surprisingly, the compounds of the invention possess FR activity at industrially acceptable levels, although they are non-halogenated. Furthermore, the FR efficacy can be achieved in desirable low amounts of the present compounds, and, advantageously, if needed, even higher amounts can be used without impairing the properties of the polymer in the FR compositions of the invention.

The instant compounds may be used in combination with halogenated and/or non-halogenated FR compounds, for example non-halogenated ones, to improve flame retarding efficacy. Such halogenated and/or non-halogenated FR compounds may be conventional organic or inorganic halogenated FR compounds or with phosphorous, antimony or metal hydroxide FR compounds. The instant compounds may have a synergistic effect on conventional FR compounds. The instant compounds may allow to reduce to the amount required of conventional FR compounds such as halogenated FR compounds or antimony FR compounds.

The instant compounds exhibit excellent flame retardancy. The instant compositions have excellent initial color and show little yellowing.

The features of the invention are defined in claims.

Accordingly, the invention provides a group of compounds of formula (I'), which bear a specific —$Z_1$—$Z_2$—$Z_3$— functionality and contain no halogen substituents with surprisingly good FR efficacy for flame retarding polymeric substrate. Said FR activity has not been disclosed in the prior art for the said compounds:

The present non-halogenated compounds have the formula (I'):

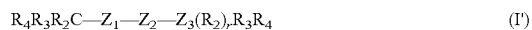

$$R_4R_3R_2C-Z_1-Z_2-Z_3(R_2)_rR_3R_4 \quad (I')$$

wherein $Z_1$ and $Z_2$ are both $NR_1$ and $Z_3$ is C or N; r is 0, when $Z_3$ is N, and r is 1, when $Z_3$ is C;

the two $R_1$'s form together a bond or each $R_1$ is independently H or forms a bond together with $R_2$ present at the adjacent C-atom or, respectively, $Z_3$;

each $R_2$ independently forms a bond or is a monovalent radical as defined for $R_3$ and $R_4$ below;

each $R_3$ is independently and each $R_4$ is independently a monovalent radical selected from H, optionally substituted alkyl, optionally substituted alkyl interrupted with one or more O, N and/or S atom(s), optionally substituted cycloalkyl, optionally substituted cycloalkylalkyl, optionally substituted aryl, optionally substituted arylalkyl, optionally substituted alkoxy(alkyl)$_n$, optionally substituted aryloxy(alkyl)$_n$, optionally substituted arylalkyloxy(alkyl)$_n$, optionally substituted alkenyl, optionally substituted alkenyloxy(alkyl)$_n$, optionally substituted alkynyl, optionally substituted alkynyloxy(alkyl)$_n$, optionally substituted heterocyclyl(O)$_s$(alkyl)$_n$ with one to four hetero atoms selected independently from N, O and S; R—Y—C(O)-(alkyl)$_n$ or R—C(O)—Y-(alkyl)$_n$, wherein R is H, or alkyl, alkenyl, cycloalkyl, aryl or heterocyclyl as defined above, each of which is optionally substituted, Y is O or NH;

or at one or both of the C-atom and $Z_3$, as given in the above formula (I'), $R_3$ and $R_4$ form together with said C-atom or, respectively, $Z_3$, wherein they are attached to, an optionally substituted, saturated, partially saturated or aromatic, mono- or polycyclic ring system of 5 to 20 carbon and, optionally, hetero ring atoms, whereby the optional hetero ring atoms are selected from N, O and/or S; and $R_2$ is a monovalent radical as defined for $R_3$ and $R_4$ above, or forms a bond between the C-atom and $Z_1$ or, respectively, between $Z_3$ and $Z_2$, or forms a bond in the ring system formed by $R_3$ and $R_4$ between said C-atom or, respectively, $Z_3$, and a ring atom adjacent thereto;

each s and n is independently 0 or 1;

or $Z_3$ forms together with $R_2$, if present, $R_3$ and $R_4$, which are attached thereto, a group —$R'_5([Z_1—Z_2—R_6—]_kZ_1—Z_2—R_5—H)_r$, wherein each $R'_5$ and $R_5$ is independently optionally substituted alkylene, optionally substituted alkylene interrupted with one or more N, O and/or S, optionally substituted cycloalkylene, optionally substituted cycloalkylenealkylene, optionally substituted cycloalkylenealkylenecycloalkylene, optionally substituted arylene, optionally substituted arylenealkylene, optionally substituted arylenealkylenearylene, optionally substituted heterocyclylene, optionally substituted heterocyclylenealkylene or optionally substituted heterocyclylenealkyleneheterocyclylene, each $R_6$ independently has a meaning as given for $R'_5$ and $R_5$ above, $Z_1$ and $Z_2$ are each independently as defined above, t is 1-3 and k is chosen so that the molecular weight of the resulting compound of formula (I') is within 200 to 10000 g/mol, e.g. k is 0-500;

or $Z_3$ together with $R_2$, if present, $R_3$ and $R_4$, which are attached thereto, represent a linking group —$R_8$— to form $R_2R_3R_4C—Z_1—Z_2—R_8—[U]_x$ which denotes a recurring structural unit of a polymer, wherein $R_8$ is a linking bond or alkylene, cycloalkylene, heterocyclylene or arylene;

U is

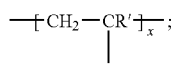

or

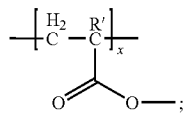

R' is H or alkyl and x is 2-500, e.g. 2-200;

or the two $R_3$'s, as given in the above formula (I'), form together with the —$(R_2R_4)C—Z_1—Z_2—Z_3((R_2)_rR_4)$— moiety an optionally substituted, saturated, partially saturated or aromatic, mono- or polycyclic ring system of 5 to 20 carbon and, optionally, further hetero ring atoms, whereby the further hetero ring atoms are selected from one or two of N, O and/or S; and wherein $Z_1$ to $Z_3$, r and $R_2$ to $R_4$ are as defined above;

as well as an oxide of N as $Z_1$-$Z_3$, a salt, an ester or an amide thereof, or of a mixture of two or more compounds of formula (I') as defined above.

For example, the instant compounds are not an oxide of N as $Z_1$-$Z_3$, a salt, an ester or an amide thereof.

Of interest is the compound of formula (I') which is selected from the following compounds of formulae (II)-(III):

a compound of formula (II)

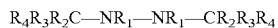   (II)

wherein the two $R_1$'s form together a bond, or each $R_1$ independently is H or forms a bond together with $R_2$ present at the adjacent C-atom as defined above;

and a compound of formula (III)

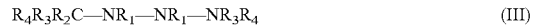   (III)

wherein the two $R_1$'s form together a bond;

wherein in the above formulae (II)-(III) $R_1$ to $R_4$ are defined as above.

Generally, a group or a moiety of a group in the definitions of the substituents, i.a. $R_2$ to $R_6$, $R'_5$, $R_8$, R, said ring system formed by $R_3$ and $R_4$ and by the two $R_3$'s, is optionally substituted with one or more, e.g. 1-5, such as 1-3, substituent(s). Such "optional substituents" may be selected independently e.g. from alkyl, alkenyl, alkynyl, cycloalkyl, cycloalkylalkyl, aryl, arylalkyl, alkoxy, aryloxy, heterocyclyl, —$N(R)_2$ wherein each R is independently as defined above, =O, —OH, —SH, COOH, R—Y—C(O)-(alkyl)$_n$, R—C(O)—Y-(alkyl)$_n$, wherein R, Y and n are as defined above. Of interest are "optional substituents" including alkyl, alkenyl, alkynyl, cycloalkyl, cycloalkylalkyl, aryl, arylalkyl, alkoxy, aryloxy, heterocyclyl, —$N(R)_2$ wherein each R is independently as defined above, —OH, COOH, R—Y—C(O)-(alkyl)$_n$, R—C(O)—Y-(alkyl)$_n$, wherein R, Y and n are as defined above. Preferred "optional substituents" include —OH, —$NH_2$, —COOH, alkyl, alkenyl, alkynyl, cycloalkyl, cycloalkylalkyl, aryl, arylalkyl, alkyl-C(O)—O—, alkenyl-C(O)—O—, such as acrylate, and/or alkyl-O—C(O)—. Any cycloalkyl, aryl or heterocyclyl as said "optional substituent" is also optionally substituted with an "optional substituent" as defined above, e.g. with 1-3 OH, alkyl and/or alkenyl, such as $CH_2$=CH—. In a further subgroup any optional substituents are as defined above except aryl or heteroaryl. For example, the "optional substituents" are alkyl, alkenyl, alkynyl, cycloalkyl, cycloalkylalkyl, for instance alkyl, cycloalkyl or cycloalkylalkyl. In another subgroup the defined groups do not have "optional substitutents", i.e. the defined groups are unsubstituted.

For example, "optionally substituted" means substituted or unsubstituted.

The present invention covers all the possible stereoisomers of the compounds (I') including cis and trans isomers, and any mixtures of the isomers, such as trans isomers or mixtures of trans and cis isomers. The individual isomers may be obtained e.g. by using corresponding isomeric forms as the starting material or by separating the desired isomer from a mixture of end products using conventional separation methods.

One preferable group of the compounds (I') are compounds of formula (I), wherein at least at one of the C-atom and $Z_3$, as depicted in the above formula (I'), $R_3$ and $R_4$ are independently other than H and $R_2$ is H or a bond.

Of interest are compounds of formula (I) with the proviso that when the compound of formula (I) is a compound of formula (100)

   (100)

the polymeric substrate (a) is not an aromatic alkenyl homo or copolymer.

For instance, compounds of formula (I) are not compounds of formula (100).

Of technical interest are compounds of formula (I) when the polymeric substrate (a) is not an aromatic alkenyl homo or copolymer.

Accordingly, the compounds (I') bear said specific substituent pattern at least at the C-atom or at $Z_1$, or at both. The compounds (I') have not been disclosed in the prior art as possessing any FR activity. The compounds (I) except hydrazones have not been disclosed in the prior art as possessing any synergistic FR activity.

Below are listed further definitions for the substituents defined in formula (I'), which can be used alone or in any combinations for defining more specific preferable subgroups of formula (I') or (I), or of any other formula given below:

The invention covers acyclic compounds (I') or (I), for example those, wherein each $R_3$ and $R_4$ are independently a monovalent radical as defined above, or form together with $Z_1$ a monovalent radical as defined above, or form together with C-atom and/or $Z_1$, wherein they are attached to, a ring system. The invention also covers cyclic compounds (I') or (I), i.e. the two $R_3$'s form together a ring system as defined above. The compound of formula (II) or (III) includes an acyclic or a cyclic azo compound, hydrazine, hydrazone, azine or triazene, or an oxide of an azo compound.

In a further subgroup, the compounds of formula (I') or (I) are acyclic with respect to —$Z_1$—$Z_2$— and symmetrically substituted, i.e. $R_2$, $R_3$ and $R_4$ at the C-atom are the same as at the $Z_3$-atom, or unsymmetrically substituted, i.e. C-atom and $Z_3$ are differently substituted. One group of the useful compounds (I') or (I) include the unsymmetrically substituted compounds.

In another subgroup, s is 0 and n is 1, or s is 1 and n is 0. Alternatively, n and s are both 1 or 0, e.g. 0.

The ring system "$R_3$ and $R_4$ form together with said C-atom or, respectively, $Z_3$, wherein they are attached to, an optionally substituted, saturated, partially saturated or aromatic, mono- or polycyclic ring system of 5 to 20 carbon and, optionally, hetero ring atoms, whereby the optional hetero ring atoms are selected from N, O and/or S" can be mono-, bi- or polycyclic ring system and includes cycloalkyl, aryl and heterocyclyl ring systems, preferably of 5-16 ring atoms. Suitably said ring system is a "cycloalkyl" as defined below, suitably a saturated or partially saturated mono- or bicyclic cycloalkyl as defined above. In case $R_3$ and $R_4$ form a hetero ring, it is preferably "heterocyclyl" as defined below, and includes e.g. 1-4 hetero ring atoms, such as 1 or 2 O and/or, preferably, N atoms.

The definition "the two $R_3$'s, as given in the above formula (I), form together with the —$(R_2R_4)C$—$Z_1$—$Z_2$—$Z_3$(($R_2)_rR_4$)— moiety an optionally substituted, saturated, partially saturated or aromatic, mono- or polycyclic ring system of 5 to 20 carbon and, optionally, further hetero ring atoms, whereby the further hetero ring atoms are selected from one or two of N, O and/or S" can be mono-, bi- or polycyclic system of 5-16 ring atoms, e.g. carbon atoms, e.g. monocyclic ring of 5-12 ring atoms, and contains no further hetero atoms, or 1 or 2 further hetero atoms, e.g. N atoms.

When $Z_3$ forms together with $R_2$, if present, $R_3$ and $R_4$, which are attached thereto, a group —$R'_5([$—$Z_1$—$Z_2$—$R_6$—$]_kZ_1$—$Z_2$—$R_5$—$H)_t$, then preferably each $R'_5$ and $R_5$ independently is optionally substituted alkylene, optionally substituted cycloalkylene, optionally substituted cycloalkylenealkylene, optionally substituted arylene, optionally substituted arylenealkylene, optionally substituted heterocyclylene or optionally substituted heterocyclylenealkylene; each $R_6$ independently is optionally substituted alkylene, optionally substituted alkylene interrupted with one or more N, O and/or S, optionally substituted cycloalkylene, optionally substituted cycloalkylenealkylene, optionally substituted cycloalkylenealkylenecycloalkylene, optionally substituted arylene, optionally substituted arylenealkylene, optionally substituted arylenealkylenearylene, optionally substituted heterocyclylene, optionally substituted heterocyclylenealkylene or optionally substituted heterocyclylenealkyleneheterocyclylene, each —$Z_1$—$Z_2$— are —$NR_1$—$NR_1$—, preferably —N=N—, t is 1 or 2, preferably 1, and k is as defined above. In another subgroup k is between 0-50, or between 0-10. "t is 1-3" means that $R'_5$ may be substituted with 1-3, e.g. 1 or 2, such as 1, substituent(s) —$[Z_1$—$Z_2$—$R_6$—$]_kZ_1$—$Z_2$—$R_5$—H. In one preferable subgroup of the present compounds each $R'_5$ and $R_5$ have the same meaning or different meaning; each —$Z_1$—$Z_2$— have the same meaning and/or each $R_6$ have the same meaning; suitably each $R'_5$ and $R_5$ have the same meaning or different meaning, e.g. the same meaning, each —$Z_1$—$Z_2$— have the same meaning and each $R_6$ have the same meaning.

$R'_5$ and $R_5$ may additionally to the definitions given above be optionally substituted cycloalkylenealkylenecycloalkylene, optionally substituted arylenealkylenearylene or optionally substituted heterocyclylenealkyleneheterocyclylene.

When $Z_3$ together with $R_2$, if present, $R_3$ and $R_4$ represents a linking group —$R_8$— to form which is a $R_2R_3R_4C$—$Z_1$—$Z_2$—$R_8$—$[U]_x$ which denotes a recurring structural unit of a polymer as defined above and x is 2-500, e.g. 2-200, then preferably said repeating structural unit is part of an alpha-olefin copolymer, e.g. a copolymer of ethylene with alpha-$C_3$-olefin, e.g. propylene, or of ethylene or propylene with alkyl acrylate or methacrylate, such as a copolymer of ethylene with ethylacrylate.

In a further subgroup of the invention the compounds of formula (I) have the formula (II) as defined above, preferably the compounds have a formula

$$R_4R_3R_2C-N=N-CR_2R_3R_4 \quad \text{(IIa)}$$

In a still further subgroup, the compounds of formula (I') or (I), preferably (II)/(IIa), are acyclic and $R_3$ and $R_4$ at the same C-atom form together therewith an optionally substituted, saturated, partly saturated or aromatic, mono- or polycyclic ring system as defined above or below, and $R_2$, $R_3$ and $R_4$ at $Z_1$ are independently a monovalent radical as defined above, e.g. alkyl, cycloalkyl, cycloalkylalkyl, aryl, arylalkyl, whereby preferably $R_2$ is H; or $Z_1$, $R_2$, $R_3$ and $R_4$ form together —$R'_5$ $([Z_1$—$Z_2$—$R_6$—$]_kZ_1$—$Z_2$—$R_5$—$H)_t$ as defined above or below; wherein each of said groups or moieties in said groups defined for said substituents is unsubstituted or substituted independently with 1-3 "optional substituents" as defined above.

Examples of the compounds of formula (II) include bis(cylcoalkylazocycloalkyl)-alkane, cycloalkylalkylazoalkane, arylalkylazoarylalkane, cycloalkylazoalkane, cycloalkylazocycloalkane, arylazoalkane and arylazoaryl compounds, preferably form bis(cylcoalkylazocycloalkyl)alkane, cycloalkylazoalkane or cycloalkylazocycloalkane, wherein any of the alkyl-, aryl-, arylalkyl-, cycloalkyl- and cycloalkylalkyl is optionally substituted with 1-3 "optional substituents" as defined above.

A further suitable subgroup of compounds (I') are compounds of formula (IIb):

$$R_4R_3R_2C-N=N-CHR'_3R'_4 \quad \text{(IIb)}$$

wherein one or both of ($R_3$ and $R_4$) and ($R'_3$ and $R'_4$) form together with said C-atom, wherein they are attached to, an optionally substituted, saturated, partially saturated or aromatic, mono- or polycyclic ring system as defined above, preferably said ring system is selected from phenyl, mono- or bicyclic cycloalkyl of 5-16 C-atoms or mono- or bicyclic heterocyclyl of 5-16 ring atoms with 1-4 N, O and/or S atoms; or each $R_3$ and $R_4$ and/or each $R'_3$ and $R'_4$ are independently H, alkyl, alkenyl, alkynyl, aryl, arylalkyl, cycloalkyl, cycloalkylalkyl, heterocyclyl or heterocyclylalkyl, wherein the cycloalkyl and heterocyclyl as a group or part of a group is mono- or bicyclic ring with 5-16 C-atoms; or and $R_2$ is H or a bond in said ring system between said C-atom and a ring atom adjacent thereto;

or C-atom denotes together with H, $R'_3$ and $R'_4$, which are attached thereto, a group —$R'_5([Z_1—Z_2—R_6—]_kZ_1—Z_2—R_5—H)_t$ as defined above, preferably each $R'_5$ and $R_5$ is independently alkylene, cycloalkylene, cycloalkylenealkylene, arylene, arylenealkylene, heterocyclylene, heterocyclylenealkylene, cycloalkylenealkylenecycloalkylene, arylenealkylenearylene or heterocyclylenealkyleneheterocyclylene; each $R_6$ independently is alkylene, alkylene interrupted with one or more N, O and/or S, cycloalkylene, cycloalkylenealkylene, cycloalkylenealkylenecycloalkylene, arylene, arylenealkylene, arylenealkylenearylene, heterocyclylene, heterocyclylenealkylene or heterocyclylenealkyleneheterocyclylene, each —$Z_1—Z_2$— are —$NR_1—NR_1$—, preferably —N=N—, t is 1 or 2, preferably 1, and k is as defined above;

whereby each group or a moiety of a group defined as variants for $R_3$, $R_4$, $R'_3$, $R'_4$, $R'_5$, $R_5$ and $R_6$ optionally substituted independently with 1-3, e.g. 1, of —OH, —$NH_2$, —COOH, alkyl, alkenyl, alkynyl, cycloalkyl, cycloalkylalkyl, aryl, arylalkyl, alkyl-C(O)—O—, alkenyl-C(O)—O—, such as acrylate, and/or alkyl-O—C(O)—, whereby cycloalkyl and/or aryl moiety as or in said optional substituents is optionally substituted with alkyl, —OH, or alkenyl, suitably with $CH_2$=CH—; as well as an oxide(s) at the azo moiety, a salt, an ester or an amide thereof.

As a further suitable subgroup are compounds of formula (IIb), wherein $R_3$ and $R_4$ form together with the C-atom a mono- or bicyclic cycloalkyl of 5-16 C-atoms, or $R_2$ and $R_3$ are H and $R_4$ is aryl, arylalkyl, mono- or bicyclic cycloalkyl, mono- or bicyclic cycloalkylalkyl, wherein cycloalkyl as a group or as a moiety of a group has of 5-16 C-atoms, and the other C-atom forms together with H, $R'_3$ and $R'_4$ a group —$R'_5([Z_1—Z_2—R_6—]_kZ_1—Z_2—R_5—H)_t$, wherein $R'_5$ and $R_5$ are different or the same and selected from mono- or bicyclic cycloalkylenealkylenecycloalkylene, arylenealkylenearylene, mono- or bicyclic heterocyclylenealkyleneheterocyclylene, alkylene, alkylene interrupted with one or more O, N and/or S, arylene, arylenealkylene, mono- or bicyclic cycloalkylene, mono- or bicyclic cycloalkylenealkylene, wherein cycloalkylene as a group or as a moiety of a group has of 5-16 C-atoms; each $R_6$ are the same and selected from alkylene, alkylene interrupted with one or more O, N and/or S, arylene, arylenealkylenearylene, mono- or bicyclic cycloalkylene, mono- or bicyclic cycloalkylenealkylenecycloalkylene, wherein cycloalkylene as a group or as a moiety of a group has of 5-16 C-atoms, each $Z_1$-$Z_2$ are —N=N—, k and t are as defined above, e.g. k is 1 and t is 1; wherein each variant or a moiety of a variant is independently optionally substituted as defined under formula (IIb) above.

A further subgroup are compounds of formula (IIb')

$R_4R_3R_2C—N=N—CHR'_3R'_4$ (IIb')

wherein one or both of ($R_3$ and $R_4$) and ($R'_3$ and $R'_4$) form together with said C-atom, wherein they are attached to, a saturated, monocyclic ring system, wherein said ring system is selected from monocyclic cycloalkyl of 5-8 C-atoms or each $R'_3$ and $R'_4$ are independently H, $C_1$-$C_{20}$alkyl or $C_5$-$C_8$cycloalkyl; and $R_2$ is H or a bond in said ring system between said C-atom and a ring atom adjacent thereto.

The invention further provides compounds of formula (IIc)

$R_4R_3R_2C—N=N—CHR'_3R'_4$ (IIc)

wherein $R_3$ and $R_4$ form together with said C-atom, wherein they are attached to, an optionally substituted, saturated or partially saturated, mono- or polycyclic ring system as defined in claim 1, preferably said ring system is selected from mono- or bicyclic cycloalkyl of 5-16 C-atoms or mono- or bicyclic heterocyclyl of 5-16 ring atoms with 1-4 N, O and/or S atoms; or each $R_3$ and $R_4$ are independently alkyl, alkenyl, alkynyl, aryl, arylalkyl, cycloalkyl, cycloalkylalkyl, heterocyclyl or heterocyclylalkyl, wherein the cycloalkyl and heterocyclyl as a group or part of a group is mono- or bicyclic ring with 5-16 ring atoms; or $R_3$ is H and $R_4$ is as defined above; and $R_2$ is H or a bond in said ring system between said C-atom and a ring atom adjacent thereto;

and C-atom denotes together with H, $R'_3$ and $R'_4$, which are attached thereto, a group —$R'_5([Z_1—Z_2—R_6—]_kZ_1—Z_2—R_5—H)_t$, wherein each $R'_5$ and $R_5$ is independently alkylene, alkylene interrupted with one or more O, N and/or S, cycloalkylene, cycloalkylenealkylene, arylenealkylene, heterocyclylene or heterocyclylenealkylene; each $R_6$ independently is alkylene, alkylene interrupted with one or more N, O and/or S, cycloalkylene, cycloalkylenealkylene, cycloalkylenealkylenecycloalkylene, arylenealkylene, arylenealkylenearylene, heterocyclylene, heterocyclylenealkylene or heterocyclylenealkyleneheterocyclylene, each —$Z_1—Z_2$— are —$NR_1—NR_1$—, preferably —N=N—, t is 1 or 2, preferably 1, and k is as defined above; whereby each group or a moiety of a group defined as variants for $R_3$, $R_4$, $R'_3$, $R'_4$, $R'_5$ and $R_6$ is optionally substituted independently with 1-3, e.g. 1, of —OH, —$NH_2$, —COOH, alkyl, alkenyl, alkynyl, cycloalkyl, cycloalkylalkyl, aryl, arylalkyl, alkyl-C(O)—O—, alkenyl-C(O)—O—, such as acrylate, and/or alkyl-O—C(O)—, whereby cycloalkyl and/or aryl moiety as or in said substituents is optionally substituted with alkenyl, such as $CH_2$=CH—;

as well as an oxide(s) at the azo moiety, a salt, an ester or an amide thereof;

with the proviso that in the compounds (IIc), (a) $R_5$ is other than methylene, and (b) when $R'_5$ is other than triazinylene, then the bridge formed by $R_6$ moiety between the two successive —$Z_1—Z_2$— moieties separates said two —$Z_1—Z_2$— moieties by 4 or more bridge atoms.

For example, the bridge formed by $R_5'$ moiety between the two successive —$Z_1—Z_2$— moieties separates said two —$Z_1—Z_2$— moieties by 4 or more bridge atoms.

For instance, in compounds of formula (IIc) $R_3$ and $R_4$ is other than methyl.

Of interest are compounds of formula (IIc) as defined above, wherein $R'_5$ and $R_5$ are independently cycloalkylenealkylenecycloalkylene or heterocyclylenealkyleneheterocyclylene in addition to the definitions given above for $R'_5$ and $R_5$.

Of interest are $R_3$ and $R_4$ that form together with said C-atom, wherein they are attached to, an optionally substituted, saturated or partially saturated, mono- or polycyclic ring system as defined herein, preferably said ring system is selected from mono- or bicyclic cycloalkyl of 5-16 C-atoms or mono- or bicyclic heterocyclyl of 5-16 ring atoms with 1-4 N, O and/or S atoms.

Of special interest are $R_3$ and $R_4$ that form together with said C-atom, wherein they are attached to, an optionally substituted, saturated or partially saturated monocyclic ring system, wherein said ring system is selected from monocyclic cycloalkyl of 5-8 C-atoms or monocyclic heterocyclyl of 5-8 ring atoms with 1-4 N and/or O atoms.

Of very special interest are $R_3$ and $R_4$ that form together with said C-atom, wherein they are attached to, an optionally substituted, saturated or partially saturated monocyclic ring system, wherein said ring system is selected from monocyclic cycloalkyl of 5-8 C-atoms.

Of utmost interest are $R_3$ and $R_4$ that form together with said C-atom, wherein they are attached to, a cycloalkyl of 5-8 C-atoms, for instance cyclohexyl.

For instance, in the group —$R'_5([Z_1-Z_2-R_6-]_kZ_1-Z_2-R_5$—H$)_t$, each $R'_5$ and $R_5$ is independently alkylene, cycloalkylene, cycloalkylenealkylene, cycloalkylenealkylenecycloalkylene, arylenealkylene or arylenealkylenearylene; each $R_6$ independently is alkylene, cycloalkylene, cycloalkylenealkylene, cycloalkylenealkylenecycloalkylene, arylenealkylene, arylenealkylenearylene, each —$Z_1-Z_2$— are —$NR_1$—$NR_1$—, preferably —N=N—, t is 1 or 2, preferably 1, and k is as defined above, e.g. 0-10; whereby each group or a moiety of a group defined as variants for $R_3$, $R_4$, $R'_3$, $R'_4$, $R'_5$ and $R_6$ is optionally substituted independently with 1-3, e.g. 1, of alkyl, alkenyl, alkynyl, cycloalkyl, cycloalkylalkyl, aryl, arylalkyl, alkyl-C(O)—O—, alkenyl-C(O)—O—, such as acrylate, and/or alkyl-O—C(O)—, whereby cycloalkyl and/or aryl moiety as or in said substituents is optionally substituted with alkenyl, such as $CH_2=CH$—.

For example, in the group —$R'_5([Z_1-Z_2-R_6-]_kZ_1-Z_2-R_5$—H$)_t$, each $R'_5$ and $R_5$ is independently alkylene, cycloalkylene, cycloalkylenealkylene or cycloalkylenealkylenecycloalkylene; each $R_6$ independently is alkylene, cycloalkylene, cycloalkylenealkylene or cycloalkylenealkylenecycloalkylene, each —$Z_1-Z_2$— are —$NR_1$—$NR_1$—, preferably —N=N—, t is 1 or 2, preferably 1, and k is as defined above, e.g. 0-3; whereby each group or a moiety of a group defined as variants for $R_3$, $R_4$, $R'_3$, $R'_4$, $R'_5$ and $R_6$ is optionally substituted independently with 1-3, e.g. 1, of alkyl, alkenyl, alkynyl, cycloalkyl, cycloalkylalkyl, arylalkyl.

Of interest are each group or a moiety of a group defined as variants for $R_3$, $R_4$, $R'_3$, $R'_4$, $R'_5$ and $R_6$ that are not optionally substituted.

Of interest is the group —$R'_5([Z_1-Z_2-R_6-]_kZ_1-Z_2-R_5$—H$)_t$, wherein each $R'_5$ and $R_5$ is independently $C_5$-$C_8$cycloalkylene, $C_5$-$C_8$cycloalkyleneC$_1$-C$_8$alkylene or $C_5$-$C_8$cycloalkyleneC$_1$-C$_8$alkyleneC$_5$-$C_8$cycloalkylene; each $R_6$ independently is $C_5$-$C_8$cycloalkylene, $C_5$-$C_8$cycloalkyleneC$_1$-C$_8$alkylene, $C_5$-$C_8$cycloalkyleneC$_1$-C$_8$alkyleneC$_5$-$C_8$cycloalkylene, each —$Z_1-Z_2$— are —$NR_1$—$NR_1$—, preferably —N=N—, t is 1 or 2, preferably 1, and k is as defined above, e.g. 0 or 1.

Of interest is the group —$R'_5([Z_1-Z_2-R_6-]_kZ_1-Z_2-R_5$—H$)_t$, wherein each $R'_5$ and $R_5$ is independently cyclohexylene, cyclohexylene-C$_1$-C$_8$alkylene, cyclohexylene-C$_1$-C$_8$alkylene-cyclohexylene; each $R_6$ independently is cyclohexylene, cyclohexyleneC$_1$-C$_8$alkylene, cyclohexylene-C$_1$-C$_8$alkylene-cyclohexylene, each —$Z_1-Z_2$— are —$NR_1$—$NR_1$—, preferably —N=N—, t is 1 or 2, preferably 1, and k is as defined above, e.g. 0 or 1, for example 0.

For instance, in compounds of formula (IIc)

$R_3$ and $R_4$ form together with said C-atom, wherein they are attached to, an optionally substituted, saturated or partially saturated monocyclic ring system, wherein said ring system is selected from monocyclic cycloalkyl of 5-8 C-atoms or monocyclic heterocyclyl of 5-8 ring atoms with 1-4 N and/or O atoms;

and C-atom denotes together with H, $R'_3$ and $R'_4$, which are attached thereto, a group —$R'_5([Z_1-Z_2-R_6-]_kZ_1-Z_2-R_5$—H$)_t$, wherein each $R'_5$ and $R_5$ is independently cycloalkylene, cycloalkylenealkylene or cycloalkylenealkylenecycloalkylene; each $R_6$ independently is cycloalkylene, cycloalkylenealkylene, cycloalkylenealkylenecycloalkylene, each —$Z_1-Z_2$— are —$NR_1$—$NR_1$—, preferably —N=N—, t is 1 or 2, preferably 1, and k is as defined above, e.g. 0 or 1.

For example, in compounds of formula (IIc)

$R_3$ and $R_4$ that form together with said C-atom, wherein they are attached to, a cycloalkyl of 5-8 C-atoms, for instance cyclohexyl and C-atom denotes together with H, $R'_3$ and $R'_4$, which are attached thereto, a group —$R'_5([Z_1-Z_2-R_6-]_kZ_1-Z_2-R_5$—H$)_t$, wherein each $R'_5$ and $R_5$ is independently cyclohexylene, cyclohexylene-C$_1$-C$_8$alkylene, cyclohexylene-C$_1$-C$_8$alkylene-cyclohexylene; each $R_6$ independently is cyclohexylene, cyclohexyleneC$_1$-C$_8$alkylene, cyclohexylene-C$_1$-C$_8$alkylene-cyclohexylene, each —$Z_1-Z_2$— are —$NR_1$—$NR_1$—, preferably —N=N—, t is 1 or 2, preferably 1, and k is as defined above, e.g. 0 or 1, for example 0.

Of interest is a compound of formula (IIc)

wherein $R_3$ and $R_4$ form together with said C-atom, wherein they are attached to, a $C_5$-$C_8$cycloalkyl;

and C-atom denotes together with H, $R'_3$ and $R'_4$, which are attached thereto, a group —$R'_5([Z_1-Z_2-R_6-]_kZ_1-Z_2-R_5$—H$)_t$, wherein each $R'_5$ and $R_5$ is independently $C_1$-$C_8$alkylene, $C_5$-$C_8$cycloalkylene, $C_5$-$C_8$cycloalkylene-C$_1$-C$_8$alkylene, $C_5$-$C_8$cycloalkylene-C$_1$-C$_8$alkylene-C$_5$-$C_8$cycloalkylene; especially $R_5'$ is $C_5$-$C_8$cycloalkylene-C$_1$-C$_8$alkylene-C$_5$-$C_8$cycloalkylene and $R_5$ is $C_5$-$C_8$cycloalkylene; each —$Z_1-Z_2$— is —N=N—, t is 1 and k is 0.

Accordingly, in a further subgroup, especially when $R'_5$ is other than triazinylene, then if $R_6$ is a chain, e.g. alkylene, it is at least $C_4$-alkylene, and if $R_6$ is a divalent ring system, the length of bridge formed by the part of the ring is at least 4 atoms, e.g. $C_{5-8}$cycloalk-1,4-diyl. These compounds (IIc) are novel and form part of the invention.

Such compounds may form dendrimers, especially with recurring azo groups.

Examples of compounds of formula (IIb) include: bis(cycloalkylazocycloalkyl)alkane, arylazoalkanes, arylazoarylalkanes, arylazocycloalkanes, arylazocycloalkylalkanes, cycloalkylazocycloalkanes and alkylazoalkanes, and compounds of formula (IIc) include bis(cycloalkylazocycloalkyl) alkane; each optionally substituted e.g. with 1-3 substituent(s) as defined above, such as with a substituent R"=alkenyl, e.g. $CH_2$=CH—, $NH_2$, —OH, —COOH, —O—C(O)—CH=CH$_2$ or —C(O)O-alkyl, non-limiting examples being R"—$(CH_2)_{2-20}$—N=N—C$_{5-8}$-cycloalkyl, wherein the cycloalkyl is suitably a saturated monocycle and R" as defined above. Representatives of the compounds (IIb) and (IIc) are N-cyclohexyl-N'-n-hexadecyl-diazene and 4,4'-bis(cyclohexylazo-cyclohexyl)methane.

In a further suitable subgroup of the present compounds or e.g. in compounds of formula (I'), (I), (IIa), (IIb) or (IIc):

(i) at one of the C-atom and $Z_3$, as depicted in formula (I'), $R_2$, $R_3$ and/or $R_4$ is a monovalent radical selected from optionally substituted alkyl, optionally substituted cycloalkyl, optionally substituted cycloalkylalkyl or optionally substituted heterocyclyl(O)$_s$(alkyl)$_n$ as defined above, whereby each said ring as a group or as part of a group is saturated or partially saturated, such as saturated, ring system; and any remaining $R_2$, $R_3$ or $R_4$ is a group or forms a group other than aryl or heteroaryl; preferably one of $R_3$ and $R_4$ is optionally substituted alkyl, optionally substituted cycloalkyl, optionally substituted cycloalkylalkyl or optionally substituted heterocyclyl $(O)_s(alkyl)_n$ as defined above, whereby each said ring as a group or as part of a group is saturated or partially saturated, such as saturated, ring system, and the other of $R_3$ and $R_4$ is alkyl or H, e.g. H, and $R_2$, if present, is a bond or H, e.g. H; or (ii) at one of the C-atom and $Z_3$, as depicted in the formula (I'), $R_3$ and $R_4$ form together with said C-atom or, respectively, $Z_3$, wherein they are attached to, an optionally substituted, saturated or partially saturated ring system, such as saturated or partially saturated cycloalkyl or heterocyclyl, suitably cycloalkyl, each of which may be optionally substituted, and $R_2$, if present, is a bond, H or a monovalent radical as defined above other than aryl, e.g. a bond or H, such as H; preferably $R_3$ and $R_4$ form together with said C-atom; or (iii) $Z_3$-atom (as depicted in formula (I')) forms together with $R_2$, if present, $R_3$ and $R_4$ a group $-R'_5([Z_1-Z_2-R_6-]_kZ_1-Z_2-R_5-H)_t$, each $R'_5$ and $R_5$ is independently optionally substituted alkylene, optionally substituted alkylene interrupted with one or more N, O and/or S, optionally substituted cycloalkylene, optionally substituted cycloalkylenealkylene, optionally substituted cycloalkylenealkylenecycloalkylene, optionally substituted, saturated or partially saturated heterocyclylene, optionally substituted heterocyclylenealkylene or optionally substituted heterocyclylenealkyleneheterocyclylene, whereby each said ring as a group or as part of a group is saturated or partially saturated, such as saturated, ring system; each $R_6$ independently has a meaning as given for $R'_5$ and $R_5$ herein, each $Z_1$ and $Z_2$ are $-N=N-$, and k and t are as defined above, suitably t is 1 or 2, preferably 1;

the "optional substituents" being as defined above;

or both the C-atom and $Z_3$ are substituted as defined in one of (i)-(iii). Suitably the optional substituents in any of the above defined groups or in a moiety of said groups is as defined above except an aromatic ring, such as aryl and heteroaryl.

In one alternative subgroup of the invention $R_2$-$R_4$ at the C-atom as depicted in formula (I') bear or form no aromatic ring systems, such as aryl and heteroaryl. In another subgroup both at the C-atom and at $Z_3$, as depicted in formula (I'), $R_2$-$R_4$ bear or form no aromatic ring systems, such as aryl and heteroaryl.

The terms employed above or below under any of the given formulae and under lists defining separately a substituent or a subgroup, mean in general as follows, unless otherwise stated: The term "alkyl", "alkenyl" and "alkynyl" as a group or as part of another group (such as in "arylalkyl") include both straight and branched chain radicals of up to 50 carbon atoms, preferably up to 20 carbon atoms. In certain embodiments and, particularly, in case "alkyl", "alkenyl" and "alkynyl" are as part of another group, as "optional substituent(s)" for a given group or as $R_8$, they suitably contain up to 9, preferably up to 6 or 4, e.g. 1 or 2, carbon atoms. Furthermore, "Alkenyl" and "alkynyl" may have one or more double or, resp., triple bonds, e.g. one double or, resp., one triple bond, e.g. radical of 1-alkenyl. "Alkyl interrupted with a hetero atom" may have a one or more, suitably 1-5, such as 1, hetero atom. "Cycloalkyl" as a group or as part of another group is saturated or partially saturated mono-, bi-, or polycyclic carbocycle of 3-16, preferably of 5-12 carbon atoms, suitably saturated monocyclic ring, such as cyclopentyl, cyclohexyl, cycloheptyl or cyclooctyl, for instance cyclohexyl, or saturated bicyclic ring, such as a "monocycle" as defined above which is fused with a saturated ring moiety of 5 to 8 ring atoms, e.g. with cyclohexyl moiety. Alternatively, partially saturated "cycloalkyl" is as defined above for saturated cycloalkyl except that it contains e.g. one to two double or, resp., triple bond(s) in the ring structure thereof, whereby in case of a bicycle also systems wherein a saturated monocycle is fused with an aromatic ring moiety, e.g. benzo moiety, are covered. "Aryl" is phenyl or naphthyl, preferably phenyl. "Heterocyclyl" as used alone or as part of "heterocyclyl(O)$_s$(alkyl)$_n$" has 5 to 16 ring atoms with one to four heteroatoms selected from N, O and/or S and the remainder of the ring atoms being carbon atoms and can be mono-, bi-, or polycyclic, e.g. 5-6 membered monocyclic ring. Said heterocyclyl covers saturated or partially saturated heterocyclyls and aromatic heterocyclyls, i.e. heteroaryls.

The term "alkylene" as a group or as part of another group comprises 1-20 carbon atoms, for example 1-8 carbon atoms, especially 1-4 carbon atoms, for instance methylene or ethylene. For instance, the term "alkylene" comprises 4-8 carbon atoms. "Arylene" is phenylene or naphthylene, preferably phenylene. "Cycloalkylene" as a group or as part of another group is saturated or partially saturated mono-, bi-, or polycyclic carbocycle of 3-16, preferably of 5-12 carbon atoms, suitably saturated monocyclic ring, such as cyclopentylene, cyclohexylene, cycloheptylene or cyclooctylene, for instance cyclohexylene, or saturated bicyclic ring, such as a "monocycle" as defined above which is fused with a saturated ring moiety of 5 to 8 ring atoms, e.g. with cyclohexylene moiety.

The term alkyl may comprise within the limits of the given number of carbon atoms, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, 2-methylheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl or dodecyl.

In the context of the description of the present invention, the term alkylene comprises within the limits of the given number of carbon atoms, for example methylene and the branched and unbranched isomers of ethylene, propylene, butylene, pentylene, hexylene, heptylene, octylene, nonylene, decylene, undecylene, dodecylene, tridecylene and tetradecylene.

The term alkoxy may comprise within the limits of the given number of carbon atoms, for example methoxy and ethoxy and the branched and unbranched isomers of propoxy, butoxy, pentyloxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy and octadecyloxy.

Examples of alkenyl are vinyl, allyl, butenyl, pentenyl, hexenyl, heptenyl, octenyl, nonenyl, decenyl, undecenyl and dodecenyl.

A term such as cycloalkylenealkylenecycloalkylene means that this group contains the given groups, in this case cycloalkylene, alkylene and cycloalkalene connected in the order given in the term. The meaning of other groups containing more than one given group is analogous to the example given above.

For example, the compound of formula (I) or (I') is:

1. an azo compound, i.e. a compound containing a group of formula $-N=N-$.

2. a hydrazine, i.e. a compound containing a group of formula $-NH-NH-$.

3. a hydrazone, i.e. a compound containing a group of formula >C=N—NH—.

4. an azine, i.e. a compound containing a group of formula >C=N—N=C<.

5. a triazene, i.e. a compound containing a group of formula —N=N—N<.

Of interest is a compound of formula (I) or (I') that is not a triazene.

For example, the compound of formula (I) or (I') is not a triazene and/or is not an oxide of N as $Z_1$-$Z_3$, a salt, an ester or an amide thereof, especially not a triazene and/or an oxide of N as $Z_1$-$Z_3$.

For instance, in the compound of formula (I) or (I') the definitions are selected from the group consisting of:

A. each $R_3$ is independently and each $R_4$ is independently a monovalent radical selected from H, optionally substituted alkyl, optionally substituted alkyl interrupted with one or more O, N and/or S atom(s), optionally substituted cycloalkyl, optionally substituted cycloalkylalkyl, optionally substituted aryl, optionally substituted arylalkyl, optionally substituted alkoxy(alkyl)$_n$, optionally substituted aryloxy(alkyl)$_n$, optionally substituted arylalkyloxy(alkyl)$_n$, optionally substituted alkenyl, optionally substituted alkenyloxy(alkyl)$_n$, optionally substituted alkynyl, optionally substituted alkynyloxy(alkyl)$_n$, optionally substituted heterocyclyl(O)$_s$(alkyl)$_n$ with one to four hetero atoms selected independently from N, O and S; R—Y—C(O)-(alkyl), or R—C(O)—Y-(alkyl)$_n$, wherein R is H, or alkyl, alkenyl, cycloalkyl, aryl or heterocyclyl as defined above, each of which is optionally substituted, Y is O or NH; and each s and n is independently 0 or 1;

B. at one or both of the C-atom and $Z_3$, as given in the above formula (I'), $R_3$ and $R_4$ form together with said C-atom or, respectively, $Z_3$, wherein they are attached to, an optionally substituted, saturated, partially saturated or aromatic, mono- or polycyclic ring system of 5 to 20 carbon and, optionally, hetero ring atoms, whereby the optional hetero ring atoms are selected from N, O and/or S; and $R_2$ is a monovalent radical as defined for $R_3$ and $R_4$ above, or forms a bond between the C-atom and $Z_1$ or, respectively, between $Z_3$ and $Z_2$, or forms a bond in the ring system formed by $R_3$ and $R_4$ between said C-atom or, respectively, $Z_3$, and a ring atom adjacent thereto with the proviso that when one;

C. $Z_3$ forms together with $R_2$, if present, $R_3$ and $R_4$, which are attached thereto, a group —R'$_5$([Z$_1$—Z$_2$—R$_6$—]$_k$Z$_1$—Z$_2$—R$_5$—H)$_t$, wherein each R'$_5$ and R$_5$ is independently optionally substituted alkylene, optionally substituted alkylene interrupted with one or more N, O and/or S, optionally substituted cycloalkyl, optionally substituted cycloalkylenealkylene, optionally substituted cycloalkylenealkylenecycloalkylene, optionally substituted arylene, optionally substituted arylenealkylene, optionally substituted arylenealkylenearylene, optionally substituted heterocyclylene, optionally substituted heterocyclylenealkylene or optionally substituted heterocyclylenealkyleneheterocyclylene, each $R_6$ independently has a meaning as given for R'$_5$ and R$_5$ above, $Z_1$ and $Z_2$ are each independently as defined above, t is 1-3 and k is chosen so that the molecular weight of the resulting compound of formula (I') or (I) is within 200 to 10000 g/mol, e.g. k is 0-500;

and

D. $Z_3$ together with $R_2$, if present, $R_3$ and $R_4$, which are attached thereto, represent a linking group —$R_8$— to form $R_2R_3R_4C$—$Z_1$—$Z_2$—$R_8$—[U]$_x$ which denotes a recurring structural unit of a polymer, wherein $R_8$ is a linking bond or alkylene, cycloalkylene, heterocyclylene or arylene;

U is

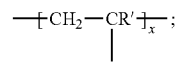

or

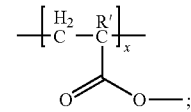

R' is H or alkyl and x is 2-500, e.g. 2-200;

and the remainder of the substituents are as defined above.

For example, substituents at the group —$Z_1$—$Z_2$— in compounds of formula (I) or (I') are:

a1) both as defined under A.

a2) one as defined under A and one as defined under B.

a3) one as defined under A and one as defined under C.

a4) one as defined under A and one as defined under D.

a5) both as defined under B.

a6) one as defined under B and one as defined under C.

a7) one as defined under B and one as defined under D.

For instance, the compound of formula (I') or (I) is as defined under:

1 and a1).
1 and a2).
1 and a3).
1 and a4).
1 and a5).
1 and a6).
1 and a7).
1 and a6), especially.

For example, the compound of formula (I') or (I) is as defined under:

2 and a1).
2 and a2).
2 and a3).
2 and a4).
2 and a5).
2 and a6).
2 and a7).
2 and a6), especially.

Of interest are compounds of formula (I') or (I) that are as defined under:

3 and a1).
3 and a2).
3 and a3).
3 and a4).
3 and a5).
3 and a6).
3 and a7).
3 and a6), especially.

Of technical interest are compounds of formula (I') or (I) that are as defined under:
4 and a1).
4 and a2).
4 and a3).
4 and a4).
4 and a5).
4 and a6).
4 and a7).
4 and a6), especially.

For instance, the compound of formula (I') or (I) is as defined under:
5 and a1).
5 and a2).
5 and a3).
5 and a4).
5 and a5).
5 and a6).
5 and a7).
5 and a6), especially.

In FR use the compound of the invention can be added to the polymeric substrate alone or as a mixture of one or more compounds (I'). The amount is chosen in a manner known in the art so that an industrially acceptable flame retarding property is provided to the polymeric substrate. Naturally the amount varies depending i.e. on the used polymeric substrate and use of application of the obtained flame retarded polymeric substrate and can be determined by a skilled person. As an example, amounts from 0.1-20 weight-% based on the polymeric substrate (a), preferably 0.1-10 wt-%, for example 0.1-5 wt-%.

The present invention further provides a FR composition, comprising (a) a polymeric substrate and (b) at least one compound of formula (I'), (I) or (II)/(IIa)/(IIb)/(IIc).

For instance, a FR composition comprises (a) a polymeric substrate and (b) at least one compound of formula (I).

For example, a FR composition comprises (a) a polymeric substrate, (b) at least one compound of formula (I) and (c) a further flame retardant.

For instance, a FR composition comprises (a) a polymeric substrate and (b) at least one compound of formula (I)

with the proviso that the composition does not contain any other FR compound.

For example, a flame retardant composition as described above comprises (c) a further flame retardant.

Of interest is a further flame retardant (c) that is a halogenated flame retardant, a phosphorus compound, metal hydroxide, metal hydrate, metal oxides, a melamine based flame retardant, N-hydrocarbyloxy substituted (NOR) hindered amine FR, an aluminium compound, an antimony compound or a boron compound or mixtures thereof.

Of utmost interest is a further flame retardant (c) that is a halogenated flame retardant, a phosphorus compound, a melamine based flame retardant, N-hydrocarbyloxy substituted (NOR) hindered amine FR or an antimony compound.

For example, FR compositions comprise (a) a polymeric substrate and (b) a compound of formula (I')

with the proviso that the FR compositions do not contain any halogenated FR compounds.

The present invention also provides a flame retardant composition comprising (a) a polymeric substrate, (b) a compound of formula (I') and (d) a further flame retardant other than the compound of formula (I'), with the proviso that the further flame retardant is other than a halogenated flame retardant compound.

For example, a FR composition comprises (a) a polymeric substrate and (b) at least one compound of formula (I')

with the proviso that the composition does not contain any other FR compound.

For instance, a flame retardant composition comprises (a) a polymeric substrate, (b) an azo compound of formula (I') and (c) a further flame retardant with the proviso that the azo compound of formula (I') is stable at temperatures higher than 180° and the polymeric substrate (a) is not an aromatic alkenyl polymer or copolymer.

Of interest is a flame retardant composition comprising (a) a polymeric substrate, (b) an azine compound of formula (I') and (c) a further flame retardant.

For example, the further flame retardant (d) is a further flame retardant (c) which does not contain halogen.

Of interest are further flame retardants (c) that do not contain halogen. For instance, the further flame retardants (c) is not a phosphate based flame retardant.

For instance, the further flame retardant (c) or (d) is added to the composition in amounts from 0.1-30 weight-% based on the polymeric substrate (a), preferably 1-15 wt-%, for example 1-10 wt-%.

Of technical interest is a weight ratio of instant compounds to further flame retardants (c) or (d) of 1:100 to 10:1, for example 1:20 to 5:1, for instance 1:10 to 2:1.

The halogenated flame retardants useful as component (c) in compositions of present invention may be selected from organic aromatic halogenated compounds such as halogenated benzenes, biphenyls, phenols, ethers or esters thereof, bisphenols, diphenyloxides, aromatic carboxylic acids or polyacids, anhydrides, amides or imides thereof; organic cycloaliphatic or polycycloaliphatic halogenated compounds; and organic aliphatic halogenated compounds such as halogenated paraffins, oligo- or polymers, alkylphosphates or alkylisocyanurates. These components are largely known in the art, see e.g. U.S. Pat. Nos. 4,579,906 (e.g. col. 3, lines 30-41), 5,393,812; see also Plastics Additives Handbook, Ed. by H. Zweifel, 5$^{th}$ Ed., Hanser Publ., Munich 2001, pp. 681-698.

The halogenated flame retardant may be, for example, a chlorinated or brominated compound, e.g. selected from the following compounds:

tetraphenyl resorcinol diphosphite (FYROFLEX® RDP, Akzo Nobel), chloroalkyl phosphate esters (ANTIBLAZE® AB-100, Albright & Wilson; FYROL® FR-2, Akzo Nobel), polybrominated diphenyl oxide (DE-60F, Great Lakes Corp.), decabromodiphenyl oxide (DBDPO; SAYTEX® 102E), tris[3-bromo-2,2-bis(bromomethyl)propyl]phosphate (PB 370®, FMC Corp.), bis(2,3-dibromopropyl ether) of bisphenol A (PE68), brominated epoxy resin, ethylene-bis(tetrabromophthalimide) (SAYTEX® BT-93), bis(hexachlorocyclopentadieno)cyclooctane (DECLORANE PLUS®), chlorinated paraffins, 1,2-bis(tribromophenoxy)ethane (FF680), tetrabromo-bisphenol A (SAYTEX® RB100 or SAYTEX CP-2000), ethylene bis-(dibromo-norbornanedicarboximide) (SAYTEX® BN-451), bis-(hexachlorocyclopentadieno)cyclooctane (DECLORANE Plus®), tris-(2,3-dibromopropyl)-isocyanurate, ethylene-bis-tetrabromophthalimide 1,2,5,6,9,10-hexabromo-cyclo-dodecan, ethane-1,2-bis(pentabromophenyl), tetrabromobisphenol A-bis-(allyl ether), dibromocyclohexane, tribromophenol-cyanurate (Dead Sea® FR-245), tris(2-chloroethyl)phosphate, tris(2,3-dibromopropyl)phosphate, tris(2,3-dichloropropyl)phosphate, chlorendic acid, tetrachlorophthalic acid, tetrabromophthalic acid, bis(N,N'-hydroxyethyl)tetrachloro-phenylenediamine, poly-β-chloroethyltriphosphonate-mixture, octabromodiphenylether, hexachlorocyclopentadiene-derivate, ethylene-bis(dibromo-norbornanedicarboximide) (Saytex® BN451), bis-(hexachlorocyclopentadiene)-cyclooctane, polytetrafluoroethylene (Teflon® GC);

with or without addition of an antimony synergist such as $Sb_2O_3$.

Examples of a phosphorus compound FR are tetraphenyl resorcinol diphosphite (FYROFLEX® RDP, Akzo Nobel), triphenyl phosphate, ammonium polyphosphate (APP or HOSTFLAM® AP750)

resorcinol diphosphate oligomer (RDP) and ethylenediamine diphosphate (EDAP), trioctylphosphate, tricresylphosphate, tetrakis(hydroxymethyl)phosphoniumsulfide, diethyl-N,N-bis(2-hydroxy-ethyl)-aminomethylphosphonate, hydroxyalkylesters of phosphoric acid, phosphazene flame retardants.

For instance, the metal hydroxide is magnesium hydroxide.

The metal oxide may be zinc oxide, molybdenum trioxide, $Sb_2O_5$ or $Sb_2O_3$.

For instance, the melamine based FR is melamine phosphate (MELAPUR® MP), melamine pyrophosphate, melamine ammonium polyphosphate, melamine ammonium pyrophosphate, melamine cyanurate (MELAPUR® MC), melamine borate, melamine polyphosphate (Melapur® 200) or melamine cyanurate (Melapur® MC50).

For example, N-hydrocarbyloxy substituted (NOR) hindered amine FR is the reaction product of 2,4-bis[(1-cyclohexyloxy-2,2,6,6-piperidin-4-yl)butylamino]-6-chloro-s-triazine with N,N'-bis(3-aminopropyl)ethylenediamine) [CAS 191680-81-6] or 1-(2-hydroxy-2-methylpropoxy)-4-octadecanoyloxy-2,2,6,6-tetramethylpiperidine.

For example, an aluminium compound FR is alumina trihydrate or aluminium salt of diethylphosphonic acid (DEPAL®).

Examples of an antimony compound is $Sb_2O_5$ and $Sb_2O_3$.

A boron compound is for example zinc borate.

Other further FR that may be useful in the compositions of the present invention are oligomeric diisopropyl benzene, silica, silicone, calcium silicate or magnesium silicate, calcium sulfate and magnesium carbonate.

Furthermore, the compounds of the invention may be used as FR synergists in a mixture with one or more further FR's. Such mixtures are also covered by the composition of the invention. It is possible, if desired, to combine the specific compounds (I) or (IIb)/(IIc) with halogenated FR's, but preferably any further flame retardant used in the composition of the invention is a non-halogenated FR. Examples of the usable further FR's include NOR-hindered amines (see WO99/00450), aluminium and boron compounds, such as aluminium trihydrate, magnesium hydroxide, intumescent systems, e.g. expandable graphite.

If synergistic mixtures with the other compounds (I') or with further FR's other than compounds (I') as described above are used, then naturally lower amounts of a compound (I') are needed to achieve an effective FR effect.

The instant invention further pertains to a method of flame retarding a polymeric substrate (a), wherein a compound of formula (I) or a compound of formula (IIb) or (IIc) or a mixture thereof is added to the polymeric substrate.

Of interest is a method of flame retarding a polymeric substrate (a), wherein at least one compound of formula (I) is added to the polymeric substrate.

Of importance is a method of flame retarding a polymeric substrate (a), wherein at least one compound of formula (I) and at least one further flame retardant (c) is added to the polymeric substrate.

Of general interest is a method of flame retarding a polymeric substrate (a), wherein at least one compound of formula (I) is added to the polymeric substrate with the proviso that the polymeric substrate (a) does not contain any other flame retardants.

Of interest is a method of flame retarding a polymeric substrate (a), wherein at least one compound of formula (I') is added to the polymeric substrate with the proviso that the polymeric substrate does not contain one or more halogenated flame retardants.

Of technical interest is a method of flame retarding a polymeric substrate (a), wherein at least one compound of formula (I') and at least one further flame retardant (d) is added to the polymeric substrate with the proviso that the polymeric substrate does not contain one or more halogenated flame retardants.

Of importance is a method of flame retarding a polymeric substrate (a), wherein at least one compound of formula (I') is added to the polymeric substrate with the proviso that the polymeric substrate (a) does not contain any other flame retardants.

For example, any instant compound may be used as a flame retardant for a polymeric substrate (a).

An embodiment of this invention is the use of a compound of formula (I) as a flame retardant for a polymeric substrate (a).

Of interest is the use of a compound of formula (I) as a flame retardant in combination with at least one further flame retardant (c) for a polymeric substrate (a).

Of technical interest is the use of at least one compound of formula (I) as a flame retardant for a polymeric substrate (a)

with the proviso that the polymeric substrate (a) does not contain any other flame retardants.

Another embodiment of this invention is the use of a compound of formula (I') as a flame retardant for a polymeric substrate (a)

with the proviso that the polymeric substrate does not contain one or more halogenated flame retardants.

Of technical interest is the use of a compound of formula (I') as a flame retardant in combination with at least one further flame retardant (d) for a polymeric substrate (a) with the proviso that the polymeric substrate does not contain one or more halogenated flame retardants.

Of general interest is the use of at least one compound of formula (I') as a flame retardant for a polymeric substrate (a)

with the proviso that the polymeric substrate (a) does not contain any other flame retardants.

The instant hydrazine compounds are for example such as described by E. Mueller in Houben-Weyl, Methoden der Organischen Chemie, 4. Auflage, Band 10/2, S. 5-70, Georg Thieme Verlag Stuttgart 1967.

Examples of hydrazine compounds that can be used in the present invention are methyl hydrazine, dimethyl hydrazine, trimethyl hydrazine, N,N dimethyl hydrazine, N,N' dimethyl hydrazine, ethyl hydrazine, N,N diethyl hydrazine, N,N' diethyl hydrazine, N,N didodecyl hydrazine, N,N' didodecyl hydrazine, N,N dicetyl hydrazine, N,N' dicetyl hydrazine, hexyl hydrazine, octyl hydrazine, N,N dihexyl hydrazine, N,N dioctyl hydrazine, cyclopentyl hydrazine, triethyl hydrazine, triallyl hydrazine, tripropyl hydrazine, tributyl hydrazine, trihexyl hydrazine, trioctyl hydrazine, tetrapropyl hydrazine, tetrabenzyl hydrazine, (2-hydroxypropyl) hydrazine, (3-hydroxypropyl) hydrazine, (4-hydroxybutyl) hydrazine, N,N (bis-carboxymethyl) hydrazine, 1,4-diamino piperidine, 1,1-bipiperidyl, 1,4-dipiperidino-piperazin, N,N dimethyl hydrazine dihydrochlorid, bis(2-phenyl-ethyl)hydrazine, tris(2-phenyl-ethyl)hydrazine, pyrazolidine, methylhydrazinium hydrogensulfate, phenyl hydrazine, diphenyl hydrazine and beta-formyl phenyl hydrazine.

For instance, the instant azine compounds are as described by D. Kolbah and D. Koruncev in Houben-Weyl, Methoden der Organischen Chemie, 4. Auflage, Band 10/2, S. 89-122, Georg Thieme Verlag Stuttgart 1967 such as diethyliden hydrazine, dibutyliden hydrazine, dibenzylidenhydrazine, diisopropyliden hydrazine, bis(1,5-dimethyl-cyclohex-1-en-3-yliden)hydrazine and bis(diphenylmethylen)hydrazine.

For instance, hydrazone compounds that can be used in the present invention are described by E. Enders in Houben-Weyl, Methoden der Organischen Chemie, 4. Auflage, Band 10/2, S. 410-487, Georg Thieme Verlag Stuttgart 1967, especially benzaldehyd phenylhydrazone, glyoxal-bis-phenylhydrazone, phenylglyoxal-bis-phenylhydrazone, acetophenone-phenylhydrazone, benzophenone-phenylhydrazone, D-glucose-phenylosazone, (2-hydroxy-propionaldehyd)-phenylhydrazone, phenylglyoxal-phenylhydrazone, benzophenone-alpha-acetyl-phenylhydrazone, salicylaldehyd-phenylhydrazone, (4-isopropyl-benzaldehyd)-phenylhydrazone and 1,4-dioxo-1,4-diphenylbutane-bis (phenylhydrazone).

Examples of triazenes are described by E. Mueller in Houben-Weyl, Methoden der Organischen Chemie, 4. Auflage, Band 10/2, S. 827-835, Georg Thieme Verlag Stuttgart 1967 such as 1,3-dimethyl-triazene, 1-methyl-3-benzyl-triazene and 1,3-dimethyl-3-anilinocarbonyl-triazene.

For example, oxides of diazenes are described by E. Enders in Houben-Weyl, Methoden der Organischen Chemie, 4. Auflage, Band 10/3, S. 473-476, Georg Thieme Verlag Stuttgart 1967, E. Müller in Houben-Weyl, Methoden der Organischen Chemie, 4. Auflage, Band 10/2, S. 787-790, Georg Thieme Verlag Stuttgart 1967, especially N-phenyl-N'-benzyl-diimin-N-oxid, dicyclohexyl-diazen-N-oxid, dipropyl-diazen-N-oxid and dicyclododecyl-diazen-N-oxid.

The polymeric substrates (a) can be chosen from a wide variety of polymers including polyolefins, such as thermoplastic polyolefins, aromatic polyolefins, e.g. polystyrenes, high impact polystyrene or ABS, polycarbonates, PVC, or polysaccharide based polymers, preferably polypropylene, polyethylene, thermoplastic polyolefin, ABS, polycarbonate and high impact polystyrene, as well as any copolymers, block polymers, graft polymers or any mixtures or blends thereof.

Of interest are polymeric substrates (a) that are organic, for instance natural, semi-synthetic or synthetic organic polymeric substrates, especially synthetic organic polymeric substrates, for instance thermoplastic synthetic organic polymeric substrates.

Examples of polymeric substrates (a) which can be protected with the instant compounds are the following:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
   a) radical polymerisation (normally under high pressure and at elevated temperature).
   b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or Q-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimides, polyesterimides, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Polymeric substrates (a) of interest in present compositions are polystyrene and their copolymers, such as listed above under items 5-7, or polyolefins and their copolymers, such as listed above under items 1-3, e.g. polypropylene, polyethylene, polyisobutylene, polybut-1-ene, polybutadiene and their copolymers. Polymeric substrates (a) of technical interest in present compositions are polyolefins. For instance, polymeric substrates are polypropylene (PP) and its copolymers, especially polypropylene.

For example, the polymeric substrate (a) does not contain halogen.

For instance, aromatic alkenyl homo or copolymer are polystyrene, poly(p-methylstyrene), poly($\alpha$-methylstyrene) and its copolymers such as listed above under items 5-7, for instance polystyrene and its copolymers, for example polystyrene.

For example, the polymeric substrate (a) is not an aromatic alkenyl homo or copolymer.

The addition of the instant compounds to the polymeric substrate (a) can be carried out in all customary mixing machines in which the polymeric substrates is melted and mixed with the additives. Suitable machines are known to those skilled in the art. They are predominantly mixers, kneaders and extruders. The process is preferably carried out in an extruder by introducing the instant compounds during processing.

Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in Handbuch der Kunststoffextrusion, Vol. 1 Grundlagen, Editors F. Hensen, W. Knappe, H. Potente, 1989, pp. 3-7, ISBN: 3-446-14339-4 (Vol. 2 Extrusionsanlagen 1986, ISBN 3-446-14329-7).

For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components are added, these can be premixed or added individually. The polymeric substrates need to be subjected to an elevated temperature for a sufficient period of time, so that the desired degradation occurs. The temperature is generally above the softening point of the polymeric substrates.

In a preferred embodiment of the process of the present invention, a temperature range lower than 280° C., particularly from about 160° C. to 280° C. is employed. In a particularly preferred process variant, the temperature range from about 200° C. to 270° C. is employed. The period of time necessary for degradation can vary as a function of the temperature, the amount of material to be degraded and the type of, for example, extruder used. It is usually from about 10 seconds to 20 minutes, in particular from 20 seconds to 10 minutes.

Incorporation of the instant compounds into the polymeric substrates can be effected, for example, by mixing in or applying the these compounds by the methods which are customary in the art. The incorporation can take place prior to or during the shaping operation, or by applying the dissolved or dispersed compound to the polymer, with or without subsequent evaporation of the solvent. In the case of elastomers, these can also be stabilized as latices. A further possibility for incorporating the instant compounds into polymeric substrates is to add them before, during or directly after the polymerization of the corresponding monomers or prior to crosslinking. In this context the instant compounds can be added as it is or else in encapsulated form (for example in waxes, oils or polymers).

The instant compounds can also be added in the form of a masterbatch containing said compound in a concentration, for example, of from 2.5 to 25% by weight to the polymeric substrate to be flame retarded.

The instant compounds can judiciously be incorporated by the following methods:

as emulsion or dispersion (e.g. to latices or emulsion polymers), as a dry mixture during the mixing in of additional components or polymer mixtures, by direct introduction into the processing apparatus (e.g. extruders, internal mixers, etc), as solution or melt.

For instance, further flame retardants (c) or (d) and/or further additives are incorporated into the polymeric substrates as described above for the instant compounds.

Novel polymer compositions can be employed in various forms and/or processed to give various products, for example as (to give) films, fibres, tapes, moulding compositions, profiles, or as binders for coating materials, adhesives or putties.

For instance, in the present FR method the present compound of the invention is/are added to the polymeric substrate and the admixture is further processed to a product of an end application. The addition can be effected at any stage, e.g. during the polymerisation process of the polymer or during compounding. Alternatively, the compound of the invention can be incorporated to the backbone of a polymeric substrate or of part of a polymeric substrate, or of one or more polymeric component(s) of the polymeric substrate. Grafting can be effected in a manner known in the art using compounds (I')/(I) which comprise functionalities in the substituents $R_2$-$R_4$, e.g. double or triple bond(s), OH, —$NH_2$, —COOH, which are reactive with the functionalities of the polymeric material. Thus the compounds (I')/(I) and their use as FR cover also such embodiments, wherein they are incorporated chemically to a part or all of the polymeric material ("functionalised/grafted" polymeric material) of the polymeric substrate. If polymeric substrate comprises two or more different polymeric materials, the compound(s) (I')/(I) can be combined by mixing or grafting with one of the materials, and the rest be added to the obtained first composition.

The term "A flame retardant composition" used herein covers any bulk polymeric material, e.g. pellets, which is further processed to end products as well as the final applications, i.e. the end products. The flame retardant of the invention may thus be used i.a. for producing cables, fibres, textiles, films, laminates, polymer foams, electronic components etc.

Conventional additives other than flame retardants can also be added to the flame retardant composition of the invention in a conventional manner. Examples include UV absorbers, light stabilisers, antioxidants, colorants etc.

This invention further pertains to any instant composition comprising further additives.

Of interest are further additives that are light stabilizers, process stabilizers and UV-absorber.

For instance, further additives are phenolic and/or aminic antioxidants, hindered amine light stabilisers, UV-absorbers, phosphites, phosphonites, benzofuranones, metal stearates, metal oxides, pigments, dyes, organophosphorus compounds, hydroxylamines or mixtures thereof, especially phenolic antioxidants, hindered amine light stabilisers, phosphites, phosphonites, 2-(2'-hydroxyphenyl)benzotriazoles, 2-hydroxybenzophenones or mixtures thereof.

Examples for further additives are:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl) phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl) disulfide.

1.6. Alkylidenebisphenols, for example 2, 2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, didodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris-(3,5-di-tert-butyl-4-hydroxy-benzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxy-benzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or poly-hydric alcohols, e.g. with methanol, ethanol, n-octanol, i-octanol, octadecanol, 1,6-hexane-diol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)-hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclo-hexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octylphenothiazines, N-allylphenothiazin, N,N,N',N'-tetraphenyl-1,4-diaminobut-2-ene, N,N-bis-(2,2,6,6-tetramethylpiperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis-[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$]$_2$ where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxy-benzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Further sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro

[4,5]decane, a reaction product of 7,7,9,9-tetramethyl-2-cycloundecyl-1-oxa-3,8-diaza-4-oxospiro[4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis-(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2-{2-hydroxy-4-[1-octyloxycarbonyl-ethoxy]phenyl}-4,6-bis(4-phenylphenyl)-1,3,5-triazine wherein the octyl moiety is a mixture of different isomers.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl)methyl phosphite, bis (2,4-di-tert-butyl-6-methylphenyl)ethyl phosphite, 2,2',2"-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-di-yl)phosphite.

Especially preferred are the following phosphites:

Tris(2,4-di-tert-butylphenyl) phosphite (Irgafos®168, Ciba Specialty Chemicals), tris(nonylphenyl) phosphite,

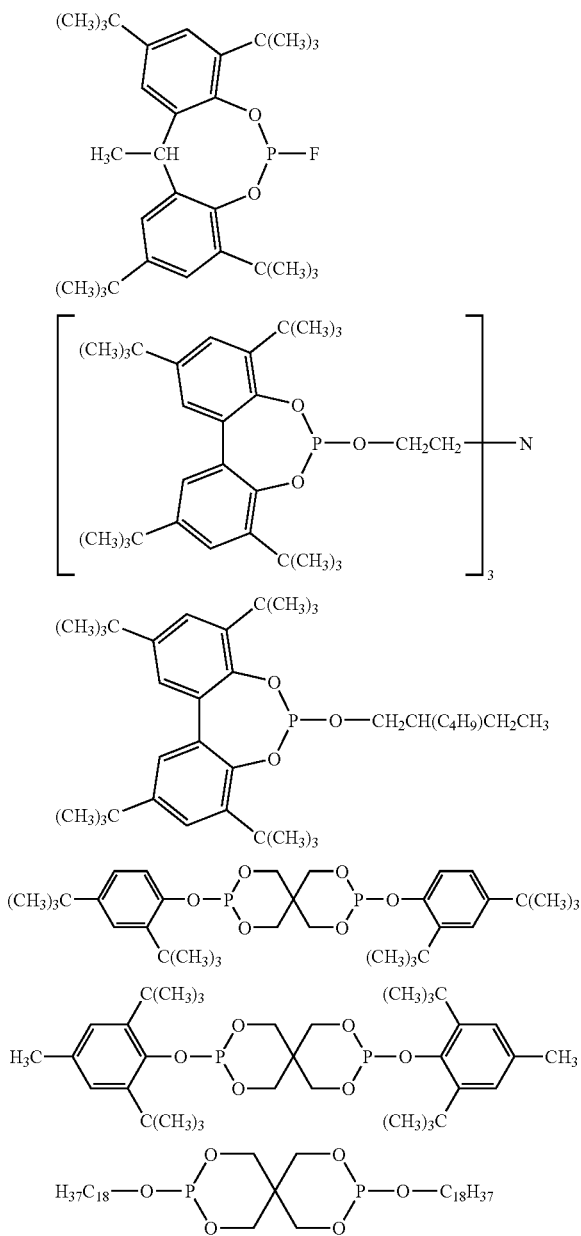

-continued

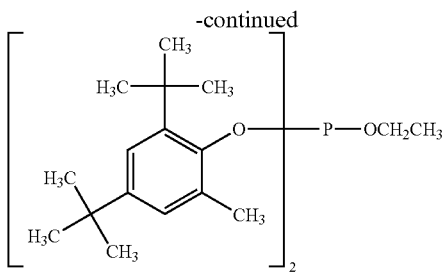

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-octadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zinc pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-di-methylphenyl)-5,7-di-tert-butyl-benzofuran-2-one.

The further additives are judiciously employed in amounts of 0.1-10% by weight, for example 0.2-5% by weight, based on the polymeric substrate (a).

The compounds of the invention can be prepared accordingly or analogously to wide variety of synthetic routes disclosed in the prior art. Some of the various methods are described below for certain preferred subgroups of the compounds.

Compounds (I')/(I) of interest include symmetrical azoalkanes. The symmetrical azoalkanes can be obtained by reacting sulfuryl chloride with at least 2 equivalents of the suitable alkylamine, followed by oxidation of the obtained N,N'-dialkylsulfamide to the azoalkane. Suitable oxidizing agents include alkaline hypochlorite.

Other compounds (I')/(I) of interest are unsymmetrical, optionally functionalised, azo compounds. These chemicals can be prepared by the skilled in the art by reacting an optionally functionalised amine with an optionally functionalised N-substituted sulfamoyl chloride, and oxidizing the obtained sulfamide derivative to yield the desired unsymmetrical, optionally functionalised, azo compound.

Azoalkanes can also be prepared by oxidation of the N,N'-dialkylhydrazine equivalent with copper (II) chloride, copper (II) acetate or mercury (II) oxide for example. When the azo functionality is part of a ring, the azo compound of interest is obtained from the oxidation of the cyclic hydrazine equivalent.

Another group of compounds (I')/(I) of interest are hydrazines. Acyclic and cyclic hydrazines may be prepared by alkylation of N,N' diformylhydrazine, diacetyl diazene, bis (2-methyl-1-oxopropyl) diazene or di(ar)alkyl azodicarboxylate for instance, and subsequent hydrolysis. A possible alternative to the synthesis of hydrazines is via the reduction of the corresponding azine, using a reducing agent such as lithium aluminum hydride or using catalytic hydrogenation techniques.

Another group of compounds (I')/(I) of interest are cyclic or acyclic hydrazones. Cyclic or acyclic hydrazones can be obtained from the condensation of a suitable carbonyl-containing compound such as aldehyde or ketone with a mono-substituted hydrazine. Hydrazones of particular interest are the tautomer equivalents to the azo compounds of interest.

Another group of compounds (I')/(I) of interest consists of azines. Azines are prepared from the condensation reaction of identical or different carbonyl-containing compound such as aldehyde or ketone with hydrazine.

Another group of compounds (I')/(I) of interest are triazenes. Alkylation of azides with nucleophiles such as grignard reagents yields 1,3-disubstituted triazenes. 1,1,3-trisubstituted triazenes are obtained from further alkylation of 1,3-disubstituted triazenes under alkaline conditions.

Another group of compounds (I')/(I) of interest is constituted of the oxides(s) of azo compounds, which includes diazene-N,N'-dioxide and diazene-N-oxide derivatives of the azo compounds. These compounds can be synthesized by treatment of the corresponding azo chemicals with an oxidative agent such as peroxy acids or peroxides.

The percentages given are weight percentages unless otherwise stated.

EXAMPLES

The used reagents and starting material were commercially available or can be prepared with the methods described in the literature.

Example 1

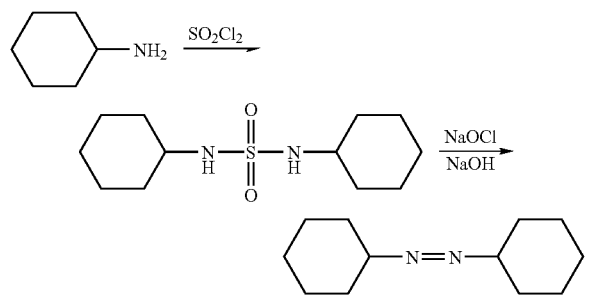

Under a nitrogen atmosphere, a solution of 98.5% sulfuryl chloride (10.0 mL, 121 mmol) in 40 mL of dichloromethane is added dropwise at 0° C. to a solution of cyclohexylamine (30.0 g, 303 mmol) and triethylamine (84 mL, 606 mmol) in 150 mL of dichloromethane. The reaction mixture is stirred 4 hours at 0° C., neutralized with water, and diluted in dichloromethane (300 mL). The organic components are successively washed with diluted hydrochloric aqueous solution, $NaHCO_3$ aqueous solution and brine, dried ($Na_2SO_4$), and concentrated under reduced pressure. The residue is suspended in ether, filtered through Büchner, and the precipitate is washed two times with 100 ml of ether to yield white crystals of N,N'-bis(cyclohexyl)sulfamide (14.0 g, 45%).

10 g of the N,N'-bis(cyclohexyl)sulfamide (38 mmol) are slowly added at 0° C. to a solution of 10% aqueous NaOCl (114 g, 153 mmol) and NaOH (6.2 g, 155 mmol). The reaction mixture is stirred 3 hours at 60° C., cooled down to room temperature and diluted in 500 mL of dichloromethane. The organic components are successively washed with water and an aqueous sodium bisulfite solution, dried ($Na_2SO_4$), and concentrated under reduced pressure. The residue is purified by chromatography (silica gel; light petroleum ether/ethyl acetate 20/1) to yield azocyclohexane as yellow-white crystals (6.5 g, 87%).

$^1$H NMR (CDCl$_3$, δ): 3.24 (m, 2H), 1.85-1.79 (m, 4H), 1.69-1.60 (m, 10H), 1.37-1.20 (m, 6H). $^{13}$C NMR (CDCl$_3$, δ): 75.9; 30.7; 25.5; 24.3. Exact mass calcd for $C_{12}H_{22}N_2$ requires m/z 194.1783, found 194.1784.

Example 2

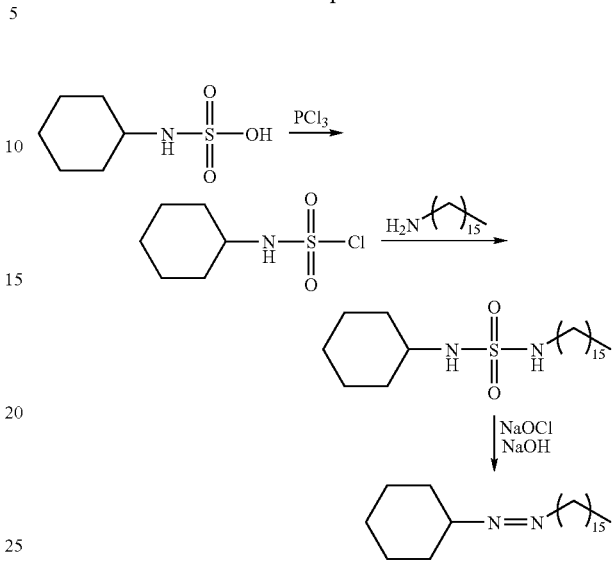

Under a nitrogen atmosphere, a solution of N-cyclohexylsulfamic acid (50 g, 279 mmol) and PCl$_5$ (58.1 g, 279 mmol) in 150 mL of toluene is very gently warmed up to 100° C. and maintained at that temperature for 1 hour. Distillation of the solution yields N-cyclohexylsulfamoyl chloride as a colorless solid (45.5 g, 82%).

A solution of 13.6 g of the cyclohexylsulfamoyl chloride (69 mmol) in 100 mL of dichloromethane is added under argon atmosphere to a solution of 1-hexadecylamine (19.9 g, 82 mmol) and triethylamine (47.5 mL, 340 mmol) in 300 mL of dichloromethane. The reaction mixture is stirred 5 hours at 0° C., neutralized with an aqueous $Na_2CO_3$ solution and concentrated under reduced pressure. The residue is taken up in dichloromethane (800 mL). The organic components are successively washed with diluted hydrochloric aqueous solution, $NaHCO_3$ aqueous solution and brine, dried ($Na_2SO_4$), and concentrated under reduced pressure. The residue is suspended in ether, filtered through Büchner, and the precipitate is washed two times with 100 ml of ether to yield a white powder of N-cyclohexyl-N'-hexadecylsulfamide (21.8 g, 79%).

The N-cyclohexyl-N'-hexadecylsulfamide is oxidized to the N-cyclohexyl-N'-n-hexadecyl-diazene using basic bleach in a procedure similar to the one described above for the synthesis of azocyclohexane from N,N'-bis(cyclohexyl)sulfamide.

The N-cyclohexyl-N'-n-hexadecyl-diazene product is obtained as a yellow solid of low melting point, in a yield of 77% from 20.0 g of N-cyclohexyl-N'-hexadecylsulfamide (50 mmol).

$^1$H NMR (CDCl3, δ): 3.70 (t, $^3$J=7.2 Hz, 2H); 3.30 (tt, $^3$J=5.2 Hz, $^3$J=5.1 Hz, 1H); 1.85-1.60 (m, 9H); 1.30-1.20 (m, 29H); 0.85 (t, $^3$J=7 Hz, 3H). $^{13}$C NMR (CDCl3 δ): 76.0; 69.0; 31.9; 30.6; 29.7 (br.); 29.6; 29.6; 29.5; 29.4; 27.6; 27.2; 25.6; 24.3; 22.7; 14.0. Exact mass calcd for $C_{22}H_{44}N_2$ requires m/z 336.3504, found 336.3503.

Example 3

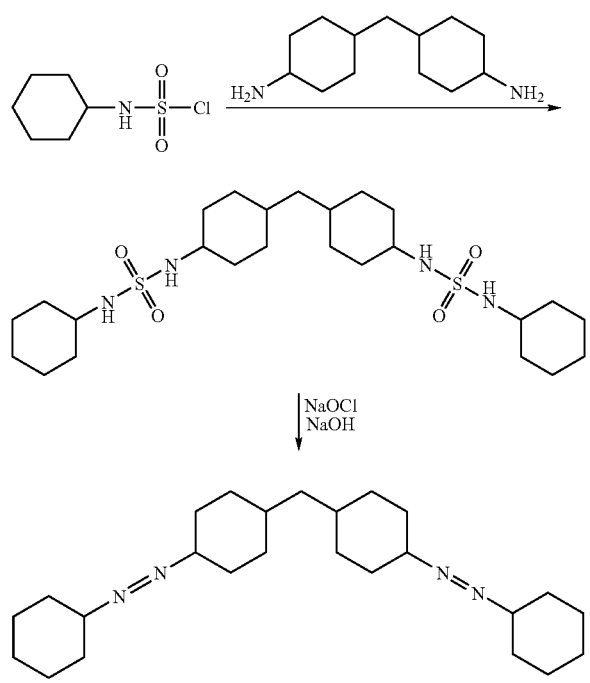

4,4'-bis(cyclohexylazocyclohexyl)methane is prepared from cyclohexylsulfamoyl chloride and 4,4'-diaminodicyclohexylmethane following a similar multistep synthesis as the one used for the synthesis of N-cyclohexyl-N'-n-hexadecyldiazene, in an overall yield of 26%.

$^1$H NMR (CDCl3, δ): 3.1-3.3 (m, 4H); 0.90-1.85 (m, 40H). Exact mass calcd for $C_{25}H_{44}N_4$ requires m/z 400.3566, found 400.3573.

Example 4

The FR efficacy of the compounds of the invention is tested.

Polypropylene is blended with 0.1% by weight of calcium stearate, 0.2% of CIBA® Irganox® B 501 and 0%, 0.25% or 0.5% of the test FR's. The blends are melt processed into fibres, spun into socks and subsequently compression molded into thin films. The FR efficacy is tested according to the known DIN 4102 Part 1 Classification B2 test method.

TABLE 1 results of a DIN 4102 test, face ignition, (230 × 90 mm samples)

| Formulation | Average damaged area (cm²) | Total burning time (sec.) |
|---|---|---|
| Blank | 184 | 32 |
| 0.25% compound of example 3 | 28 | 13 |
| 0.50% compound of example 3 | 21 | 8 |
| 0.25% compound of example 2 | 39 | 18 |
| 0.50% compound of example 2 | 31 | 13 |
| 0.25% compound of example 1 | 39 | 16 |
| 0.50% compound of example 1 | 22 | 10 |

TABLE 2

DIN 4102 test, edge ignition (190 × 90 mm samples)

| Formulation | Average damaged length (mm) | Total burning time (sec.) |
|---|---|---|
| Blank | 190 | 30.4 |
| 0.25% compound of example 3 | 37 | 10.6 |
| 0.50% compound of example 3 | 45 | 11.8 |
| 0.25% compound of example 2 | 54 | 15.8 |
| 0.50% compound of example 2 | 45 | 12.6 |
| 0.25% compound of example 1 | 41 | 11.6 |
| 0.50% compound of example 1 | 41 | 9.8 |

From these experiments, it is clear that the compounds of the invention provide fire retardancy and self-extinguishing properties to polypropylene samples at very low concentrations.

The invention claimed is:
1. A flame retardant composition, which comprises
(a) a polyolefin substrate, and
(b) at least one compound of formula (I)

$$R_4R_3R_2C-Z_1-Z_2-Z_3(R_2)_rR_3R_4 \quad (I)$$

wherein $Z_1$ and $Z_2$ are both $NR_1$ and $Z_3$ is C or N; r is 0, when $Z_3$ is N, and r is 1, when $Z_3$ is C;

the two $R_1$'s form together a bond or each $R_1$ is independently H or forms a bond together with $R_2$ present at the adjacent C-atom or, respectively, $Z_3$;

each $R_2$ independently forms a bond or is a monovalent radical as defined for $R_3$ and $R_4$ below;

each $R_3$ is independently and each $R_4$ is independently a monovalent radical selected from H, optionally substituted alkyl and optionally substituted cycloalkyl;

or at one or both of the C-atom and $Z_3$, as given in the above formula (I), $R_3$ and $R_4$ form together with said C-atom or, respectively $Z_3$, wherein they are attached to, an optionally substituted, saturated, partially saturated or aromatic, mono- or polycyclic ring system of 5 to 20 carbons; and $R_2$ is a monovalent radical as defined for $R_3$ and $R_4$ above, or forms a bond between the C-atom and $Z_1$ or, respectively, between $Z_3$ and $Z_2$, or forms a bond in the ring system formed by $R_3$ and $R_4$ between said C-atom or, respectively, $Z_3$, and a ring atom adjacent thereto;

or $Z_3$ forms together with $R_2$, if present, $R_3$ and $R_4$, which are attached thereto, a group —R'$_5$([$Z_1$—$Z_2$—$R_6$—]$_k Z_1$—$Z_2$—$R_5$—H)$_t$, wherein each R'$_5$ and $R_5$ is independently alkylene, cycloalkylene, cycloalkylenealkylene or cycloalkylenealkylenecycloalkylene: each $R_6$ independently is alkylene, cycloalkylene, cycloalkylenealkylene or cycloalkylenealkylenecycloalkylene, each —$Z_1$—$Z_2$— are —$NR_1$—$NR_1$—, t is 1 or 2 and k is 0-3;

each group or a moiety of a group defined as variants for $R_3$, $R_4$, R'$_5$ and $R_6$ is optionally substituted independently with 1-3 alkyl, alkenyl, alkynyl, cycloalkyl, cycloalkylalkyl or arylalkyl;

or $Z_3$ together with $R_2$, if present, $R_3$ and $R_4$, which are attached thereto, represent a linking group —$R_8$— to form $R_2R_3R_4C$—$Z_1$—$Z_2$—$R_8$—[U]$_x$ which denotes a recurring structural unit of a polymer, wherein $R_8$ is a linking bond or alkylene, cycloalkylene, heterocyclylene or arylene;

U is a

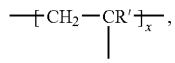

or

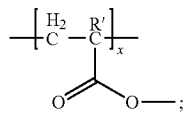

R' is H or alkyl and x is 2-500;

with the proviso that in the compound of formula (I) at least at one of the C-atom and $Z_3$, as depicted in the above formula (I), $R_3$ and $R_4$ are independently other than H and $R_2$ is H or a bond.

2. A flame retardant composition according to claim 1, wherein the compound of formula (I) is selected from the following compounds of formulae (II)-(III):

a compound of formula (II)

$$R_4R_3R_2C-NR_1-NR_1-CR_2R_3R_4 \quad (II)$$

wherein the two $R_1$'s form together a bond, or each $R_1$ independently is H or forms a bond together with $R_2$ present at the adjacent C-atom as defined in claim 1;

a compound of formula (III)

$$R_4R_3R_2C-NR_1-NR_1-NR_3R_4 \quad (III)$$

wherein the two $R_1$'s form together a bond;

wherein in the above formulae (II)-(III) $R_1$ to $R_4$ are defined in claim 1.

3. A flame retardant composition according to claim 1, wherein in the compound of formula (I) both at the C-atom and at the $Z_3$-atom $R_3$ and $R_4$ are other than H and $R_2$ is H or a bond.

4. A flame retardant composition according to claim 1, wherein the compound (I) is acyclic and $-Z_1-Z_2-$ is symmetrically substituted.

5. A flame retardant composition according to claim 1, wherein the compound (I) is acyclic and $-Z_1-Z_2-$ is unsymmetrically substituted.

6. A flame retardant composition according to claim 1, wherein the compound of formula (I) is a compound of formula $$R_4R_3R_2C-N=N-CR_2R_3R_4 \quad (IIa).$$

7. A flame retardant composition according to claim 2, wherein the compound of formula (II) is acyclic and $R_3$ and $R_4$ at the same C-atom form together therewith an optionally substituted, saturated, partly saturated or aromatic, mono- or polycyclic ring system, wherein said rings are cycloalkyl or aryl which is unsubstituted or substituted with 1-3 of alkyl, alkenyl, alkynyl, cycloalkyl, cycloalkylalkyl or arylalkyl.

8. A flame retardant composition according to claim 2, wherein the compound of formula (II) is selected from bis (cylcoalkylazocycloalkyl)alkane, cycloalkylalkylazoalkane, arylalkylazoarylalkane, cycloalkylazoalkane, cycloalkylazocycloalkane, arylazoalkane and arylazoaryl compounds, where any of the alkyl-, aryl-, arylalkyl-, cycloalkyl- or cycloalkylalkyl groups are optionally substituted with 1-3 substituents.

9. A flame retardant composition according to claim 1, wherein the compound of formula (I) is a compound of formula (IIb)

$$R_4R_3R_2C-N=N-CHR'_3R'_4 \quad (IIb)$$

wherein one or both of ($R_3$ and $R_4$) and ($R'_3$ and $R'_4$) form together with said C-atom, wherein they are attached to, an optionally substituted, saturated, partially saturated or aromatic, mono- or polycyclic ring system as defined in claim 1, wherein said ring system is selected from phenyl and mono- or bicyclic cycloalkyl of 5-16 C-atoms; or each $R_3$ and $R_4$ and/or each $R'_3$ and $R'_4$ are independently H, alkyl or cycloalkyl, wherein the cycloalkyl as a group or part of a group is mono- or bicyclic ring with 5-16 ring atoms; and $R_2$ is H or a bond in said ring system between said C-atom and a ring atom adjacent thereto.

10. A flame retardant composition according to claim 9, wherein the compound of formula (I) is a compound of formula (IIb')

$$R_4R_3R_2C-N=N-CHR'_3R'_4 \quad (IIb')$$

wherein one or both of ($R_3$ and $R_4$) and ($R'_3$ and $R'_4$) form together with said C-atom, wherein they are attached to, a saturated, monocyclic ring system, wherein said ring system is selected from monocyclic cycloalkyl of 5-8 C-atoms; or each $R'_3$ and $R'_4$ are independently H, $C_1$-$C_{20}$alkyl or $C_5$-$C_8$cycloalkyl; and $R_2$ is H or a bond in said ring system between said C-atom and a ring atom adjacent thereto.

11. A flame retardant composition according to claim 1, which comprises as component (b) a compound of formula (IIc)

$$R_4R_3R_2C-N=N-CHR'_3R'_4 \quad (IIc)$$

wherein $R_3$ and $R_4$ form together with said C-atom, wherein they are attached to, a cycloalkyl of 5-8 C-atoms and C-atom denotes together with H, $R'_3$ and $R'_4$, which are attached thereto, a group $-R'_5([Z_1-Z_2-R_6-]_kZ_1-Z_2-R_5-H)_t$, wherein each $R'_5$ and $R_5$ is independently $C_1$-$C_8$alkylene, $C_5$-$C_8$cycloalkylene, $C_5$-$C_8$cycloalkylene-$C_1$-$C_8$alkylene or $C_5$-$C_8$cycloalkylene-$C_1$-$C_8$alkylene-$C_5$-$C_8$cycloalkylene;

each $-Z_1-Z_2-$ is $-N=N-$, t is 1 and k is 0.

12. A flame retardant composition according to claim 1, that comprises (c) a further flame retardant.

13. A flame retardant composition according to claim 12, wherein the further flame retardant is a halogenated flame retardant, a phosphorus compound, metal hydroxide, metal oxide, a melamine based flame retardant, N-hydrocarbyloxy substituted (NOR) hindered amine flame retardant, an aluminium compound, an antimony compound or a boron compound or mixture thereof.

14. A flame retardant composition according to claim 1, with the proviso that the composition does not contain any halogenated flame retardant compounds.

15. A composition of claim 14, which comprises a synergistic mixture of the compound of formula (I) and one or more further flame retardants selected from non-halogenated N-hydrocarbyloxy substituted (NOR) hindered amine flame retardants, aluminium compounds, boron compounds, magnesium hydroxide and intumescent systems.

16. A composition according to claim 1, further comprising additives selected from the group consisting of phenolic or aminic antioxidants, hindered amine light stabilizers, UV-absorbers, phosphites, phosphonites, benzofuranones, metal stearates, metal oxides, pigments, dyes, organophosphorus compounds, hydroxylamines, flame retardants and mixtures thereof.

17. A flame retardant composition according to claim 1, wherein component (b) is at least one compound selected from
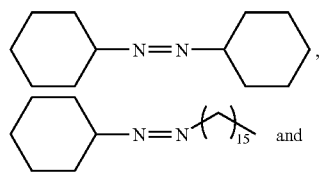,
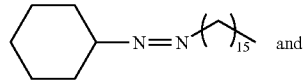 and
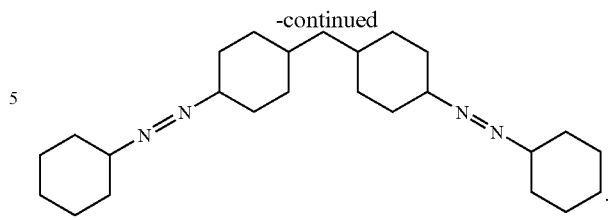.
* * * * *